(12) United States Patent
Kang et al.

(10) Patent No.: US 10,744,850 B2
(45) Date of Patent: *Aug. 18, 2020

(54) HEAT PUMP SYSTEM FOR VEHICLE

(71) Applicant: HANON SYSTEMS, Daejeon (KR)

(72) Inventors: Sung Ho Kang, Daejeon (KR); Hak Kyu Kim, Daejeon (KR); Jae Min Lee, Daejeon (KR); Jung Jae Lee, Daejeon (KR); Young Ho Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,490

(22) Filed: Apr. 2, 2019

(65) Prior Publication Data

US 2019/0225050 A1 Jul. 25, 2019

Related U.S. Application Data

(63) Continuation of application No. 14/916,107, filed as application No. PCT/KR2014/012632 on Dec. 22, 2014, now Pat. No. 10,293,659.

(30) Foreign Application Priority Data

Jan. 21, 2014 (KR) ........................ 10-2014-0007013

(51) Int. Cl.
*B60H 1/00* (2006.01)
*F25B 41/04* (2006.01)
(Continued)

(52) U.S. Cl.
CPC ..... *B60H 1/00921* (2013.01); *B60H 1/00335* (2013.01); *B60H 1/00342* (2013.01);
(Continued)

(58) Field of Classification Search
CPC ........... B60H 1/32281; B60H 1/00335; B60H 1/00342; B60H 1/143; B60H 2001/00307;
(Continued)

(56) References Cited

U.S. PATENT DOCUMENTS 7,669,558 B2 3/2010 Claypole et al.
2005/0269062 A1 12/2005 Guerrero et al.
(Continued)

FOREIGN PATENT DOCUMENTS

EP 2497662 A2 9/2012
JP 2003287294 A 10/2003
(Continued)

OTHER PUBLICATIONS

International Search Report dated Apr. 17, 2015 from International Patent Application Serial No. PCT/KR2014/012632.

*Primary Examiner* — Frantz F Jules
*Assistant Examiner* — Martha Tadesse
(74) *Attorney, Agent, or Firm* — Dickinson Wright PLLC

(57) ABSTRACT

The present invention relates to a heat pump system for a vehicle. The heat pump system includes a refrigerant-coolant heat exchanger for exchanging heat between refrigerant circulating through a refrigerant circulation line and coolant circulating through electronic units of the vehicle. The heat pump system can operate the heat pump mode even though outdoor air temperature is zero or lower or frosting is formed on the external heat exchanger because waste heat of the electronic units is retrieved through the refrigerant-coolant heat exchanger, thereby further enhancing heating performance and efficiency.

19 Claims, 9 Drawing Sheets

(51) Int. Cl.
*F25B 49/02* (2006.01)
*F25B 5/00* (2006.01)
*F25B 6/04* (2006.01)
*F25B 29/00* (2006.01)
*B60H 1/14* (2006.01)
*B60H 1/32* (2006.01)
*F28F 9/02* (2006.01)
*F25B 25/00* (2006.01)

(52) U.S. Cl.
CPC ......... *B60H 1/143* (2013.01); *B60H 1/32281* (2019.05); *F25B 5/00* (2013.01); *F25B 6/04* (2013.01); *F25B 29/003* (2013.01); *F25B 41/04* (2013.01); *F25B 49/02* (2013.01); *F28F 9/0234* (2013.01); *B60H 2001/00307* (2013.01); *B60H 2001/00928* (2013.01); *B60H 2001/00949* (2013.01); *F25B 25/005* (2013.01); *F25B 2341/066* (2013.01); *F25B 2400/0403* (2013.01); *F25B 2400/0409* (2013.01); *F25B 2600/2507* (2013.01); *F25B 2600/2519* (2013.01)

(58) Field of Classification Search
CPC . B60H 2001/00928; B60H 2001/00949; F28F 9/0234; F25B 5/00; F25B 6/04; F25B 29/003; F25B 41/04; F25B 49/02; F25B 25/005; F25B 2400/0403; F25B 2341/066; F25B 2400/0409; F25B 2600/2507; F25B 2600/2519
See application file for complete search history.

(56) References Cited

U.S. PATENT DOCUMENTS

| | | |
|---|---|---|
| 2008/0196877 A1 | 8/2008 | Zeigler et al. |
| 2009/0205353 A1 | 8/2009 | Takahashi |
| 2012/0024273 A1* | 2/2012 | Iwazaki ............... F02D 41/0085 123/703 |
| 2012/0227431 A1 | 9/2012 | Wang et al. |
| 2014/0069123 A1 | 3/2014 | Kim |
| 2015/0217625 A1 | 8/2015 | Kang et al. |
| 2015/0273981 A1 | 10/2015 | Kang et al. |

FOREIGN PATENT DOCUMENTS

| | | | | |
|---|---|---|---|---|
| JP | 2004142551 A | | 5/2004 | |
| JP | 2012017056 A | * | 1/2012 | |
| JP | 2012017056 A | | 1/2012 | |
| KR | 20040093632 A | | 11/2004 | |
| KR | 100876063 B1 | | 12/2008 | |
| KR | 20110004208 A | | 1/2011 | |
| KR | 20120024273 A | * | 3/2012 | |
| KR | 20120024273 A | | 3/2012 | |
| KR | 101342931 B1 | | 12/2013 | |
| KR | 20140001318 A | * | 1/2014 | |
| KR | 101450636 B1 | * | 10/2014 | ......... B60H 1/00921 |
| WO | WO2013136693 A1 | | 9/2013 | |
| WO | WO-2014030884 A1 | * | 2/2014 | ............. F25B 40/00 |

\* cited by examiner

PRIOR ART

HEAT PUMP SYSTEM FOR VEHICLE

CROSS-REFERENCE TO RELATED APPLICATIONS

This application is a continuation of U.S. application Ser. No. 14/916,107, filed Mar. 2, 2016, which is a National Stage of International Application No. PCT/KR2014/012632, filed Dec. 22, 2014, which claims the benefit and priority of KR 10-2014-0007013 filed Jan. 21, 2014. The entire disclosures of each of the above applications are incorporated herein by reference.

TECHNICAL FIELD

The present invention relates to a heat pump system for a vehicle, and more particularly, to a heat pump system for a vehicle which includes: a refrigerant-coolant heat exchanger for exchanging heat between refrigerant circulating through a refrigerant circulation line and coolant circulating through electronic units of the vehicle; a first refrigerant circulation line for arranging the refrigerant-coolant heat exchanger at an upstream side of the external heat exchanger; and a second refrigerant circulation line for arranging the refrigerant-coolant heat exchanger at a downstream side of the external heat exchanger, so that the refrigerant radiates heat to the coolant and outdoor air through the refrigerant-coolant heat exchanger and the external heat exchanger in an air-conditioning mode and absorbs heat from the outdoor air and the coolant through the external heat exchanger and the refrigerant-coolant heat exchanger in a heat pump mode.

BACKGROUND ART

In general, an air conditioner for a vehicle includes a cooling system for cooling the interior of the vehicle and a heating system for heating the interior of the vehicle.

At an evaporator side of a refrigerant cycle, the cooling system converts air into cold air by exchanging heat between the air passing outside an evaporator and refrigerant flowing inside the evaporator so as to cool the interior of the vehicle. At a heater core side of a coolant cycle, the heating system convers air into warm air by exchanging heat between the air passing outside the heater core and coolant flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an internal heat exchanger mounted inside an air-conditioning case for exchanging heat with air blown to the interior of the vehicle; and the other one being an external heat exchanger for exchanging heat outside the air-conditioning case, and a direction changing valve for changing a flow direction of refrigerant.

Therefore, according to the flow direction of the refrigerant by the direction changing valve, the internal heat exchanger serves as a heat exchanger for cooling when the cooling mode is operated, and serves as a heat exchanger for heating when the heating mode is operated.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; an internal heat exchanger 32 for radiating heat of the refrigerant discharged from the compressor 30; a first expansion valve 34 and a first bypass valve 36 mounted in parallel for selectively passing the refrigerant passing through the internal heat exchanger 32; an external heat exchanger 48 for exchanging heat with the refrigerant passing through the first expansion valve 34 or the first bypass valve 36 outdoors; an evaporator 60 for evaporating the refrigerant passing through the external heat exchanger 48; an accumulator 62 for dividing the refrigerant passing through the evaporator 60 into a gas-phase refrigerant and a liquid-phase refrigerant; a second expansion valve 56 for selectively expanding the refrigerant supplied to the evaporator 60; and a second bypass valve 58 mounted in parallel with the second expansion valve 56 for selectively connecting an outlet side of the external heat exchanger 48 and an inlet side of the accumulator 62.

Moreover, a chiller 50 which exchanges heat between refrigerant and coolant is mounted at the outlet side of the external heat exchanger 48.

In FIG. 1, the reference numeral 10 designates an air-conditioning case in which the internal heat exchanger 32 and the evaporator 60 are embedded, the reference numeral 12 designates a temperature-adjustable door for regulating a mixed amount of cold air and warm air, and the reference numeral 20 designates a blower mounted at an inlet of the air-conditioning case.

According to the heat pump system having the above structure, when a heat pump mode (heating mode) is operated, the first bypass valve 36 and the second expansion valve 56 are closed, and the first expansion valve 34 and the second bypass valve 58 are opened. Moreover, the temperature-adjustable door 12 is operated as shown in FIG. 1. Accordingly, the refrigerant discharged from the compressor 30 passes through the internal heat exchanger 32, the first expansion valve 34, the external heat exchanger 48, the chiller 50, the second bypass valve 58 and the accumulator 62 in order, and then, is returned to the compressor 30. That is, the internal heat exchanger 32 serves as a heater and the external heat exchanger 48 serves as an evaporator.

When an air-conditioning mode (cooling mode) is operated, the first bypass valve 36 and the second expansion valve 56 are opened, and the first expansion valve 34 and the second bypass valve 58 are closed. Furthermore, the temperature-adjustable door 12 closes a path of the internal heat exchanger 32. Therefore, the refrigerant discharged from the compressor 30 passes through the internal heat exchanger 32, the first bypass valve 36, the external heat exchanger 48, the chiller 50, the second expansion valve 56, the evaporator 60 and the accumulator 62 in order, and then, is returned to the compressor 30. That is, the evaporator 360 serves as an evaporator and the internal heat exchanger 32 closed by the temperature-adjustable door 12 serves as a heater in the same with the heat pump mode.

However, in case of the conventional heat pump system for the vehicle, in the heat pump mode (heating mode), the internal heat exchanger 32 mounted inside the air-conditioning case 10 serves as a heater to carry out heating and the external heat exchanger 48 mounted outside the air-conditioning case 10, namely, in front of the engine room of the vehicle, serves as an evaporator to exchange heat with outdoor air.

In this instance, if temperature of refrigerant flown into the external heat exchanger 48 is higher than the outdoor air, in other words, if outdoor air temperature is lower than the refrigerant temperature, the conventional heat pump system for the vehicle has a disadvantage in that the external heat exchanger 48 is deteriorated in heat exchange efficiency, for instance, the external heat exchanger cannot absorb heat from the outdoor air and frosting is formed on the external heat exchanger 48. So, the conventional heat pump system is deteriorated in heating performance and efficiency and it is impossible to operate the heat pump mode if outdoor air temperature is zero or lower.

Furthermore, in order to enhance performance of the air-cooling type external heat exchanger, thickness or an effective area for heat exchange must be increased to increase size of the external heat exchanger. However, the conventional external heat exchanger has a limit in increasing size and enhancing performance due to a small space for the engine room.

DISCLOSURE

Technical Problem

Accordingly, the present invention has been made in an effort to solve the above-mentioned problems occurring in the prior arts, and it is an object of the present invention to provide a heat pump system for a vehicle which includes: a refrigerant-coolant heat exchanger for exchanging heat between refrigerant circulating through a refrigerant circulation line and coolant circulating through electronic units of the vehicle; a first refrigerant circulation line for arranging the refrigerant-coolant heat exchanger at an upstream side of the external heat exchanger; and a second refrigerant circulation line for arranging the refrigerant-coolant heat exchanger at a downstream side of the external heat exchanger, so that the refrigerant is cooled by radiating heat to the coolant and outdoor air through the refrigerant-coolant heat exchanger and the external heat exchanger in an air-conditioning mode, thereby enhancing cooling performance without any increase of size of the external heat exchanger. Moreover, it is another object of the present invention to provide a heat pump system for a vehicle which is heated by absorbing heat from the outdoor air and the coolant (waste heat of the electronic units) through the external heat exchanger and the refrigerant-coolant heat exchanger in a heat pump mode, thereby enhancing heating performance. It is a further object of the present invention to provide a heat pump system for a vehicle which can operate the heat pump mode even though outdoor air temperature is zero or lower or frosting is formed on the external heat exchanger because waste heat of the electronic units is retrieved through the refrigerant-coolant heat exchanger, thereby further enhancing heating performance and efficiency.

Technical Solution

To achieve the above objects, the present invention provides a heat pump system for a vehicle including: a compressor mounted on a refrigerant circulation line for compressing and discharging refrigerant; an internal heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; an external heat exchanger mounted outside the air-conditioning case for exchanging heat between the refrigerant circulating through the refrigerant circulation line and the outdoor air; second expansion means mounted on the refrigerant circulation line located at an outlet of the internal heat exchanger to selectively expand refrigerant discharged from the internal heat exchanger; and first expansion means mounted on the refrigerant circulation line located at an inlet of the evaporator to expand the refrigerant supplied to the evaporator, further including: a coolant circulation line configured to circulate coolant toward electronic units of the vehicle to cool the electronic units; and a refrigerant-coolant heat exchanger configured to exchange heat between the refrigerant circulating through the refrigerant circulation line and coolant circulating through the coolant circulation line, wherein the refrigerant circulating through the refrigerant circulation line radiates heat to the coolant and the outdoor air through the refrigerant-coolant heat exchanger and the external heat exchanger in an air-conditioning mode, and wherein the refrigerant circulating through the refrigerant circulation line absorbs heat from the coolant and the outdoor air through the external heat exchanger and the refrigerant-coolant heat exchanger in a heat pump mode.

In another aspect of the present invention, the present invention provides a heat pump system for a vehicle including: a compressor mounted on a refrigerant circulation line for compressing and discharging refrigerant; an internal heat exchanger mounted inside an air-conditioning case for exchanging heat between the air inside the air-conditioning case and the refrigerant discharged from the compressor; an evaporator mounted inside the air-conditioning case for exchanging heat between the air inside the air-conditioning case and the refrigerant supplied to the compressor; and an external heat exchanger mounted outside the air-conditioning case for exchanging heat between the refrigerant circulating through the refrigerant circulation line and the outdoor air, further including: a coolant circulation line configured to circulate coolant toward electronic units of the vehicle to cool the electronic units; and a refrigerant-coolant heat exchanger configured to exchange heat between the refrigerant circulating through the refrigerant circulation line and coolant circulating through the coolant circulation line, wherein the refrigerant circulation line includes: a first refrigerant circulation line which arranges the refrigerant-coolant heat exchanger at the upstream side of the external heat exchanger to cool the refrigerant with the coolant at an inlet of the external heat exchanger in an air-conditioning mode; and a second refrigerant circulation line which arranges the refrigerant-coolant heat exchanger at the downstream side of the external heat exchanger to heat the refrigerant with the coolant at an outlet of the external heat exchanger in a heat pump mode.

Advantageous Effects

As described above, because the heat pump system for the vehicle according to the present invention includes: the refrigerant-coolant heat exchanger for exchanging heat between refrigerant circulating through the refrigerant circulation line and coolant circulating through electronic units of the vehicle; the first refrigerant circulation line for arranging the refrigerant-coolant heat exchanger at the upstream side of the external heat exchanger; and the second refrigerant circulation line for arranging the refrigerant-coolant heat exchanger at the downstream side of the external heat exchanger, the heat pump system cools the refrigerant by radiating heat to the coolant and outdoor air through the refrigerant-coolant heat exchanger and the external heat exchanger in the air-conditioning mode to enhance cooling performance without any increase of size of the external heat exchanger, heats the refrigerant by absorbing heat from the outdoor air and the coolant (waste heat of the electronic units) through the external heat exchanger and the refrigerant-coolant heat exchanger in the heat pump mode to enhance heating performance, and operates the heat pump mode even though outdoor air temperature is zero or lower or frosting is formed on the external heat exchanger because waste heat of the electronic units is retrieved through the refrigerant-coolant heat exchanger to further enhance heating performance and efficiency.

Additionally, the heat pump system for the vehicle according to the present invention does not need an additional heat exchanger, such as a chiller for retrieving waste heat of the electronic units, and a coolant line for connecting the chiller, thereby reducing the number of components and an installation space.

Moreover, the heat pump system for the vehicle according to the present invention can reduce refrigerant pressure at the time of cooling by using the refrigerant-coolant heat exchanger, thereby reducing driving power consumption of the compressor.

Furthermore, the heat pump system for the vehicle according to the present invention can reduce the diameter of a pipe because independently using the first refrigerant circulation line of the downstream side of the external heat exchanger through which liquid-phase refrigerant flows in the air-conditioning mode, thereby reducing a refrigerant charge. That is, the conventional heat pump system for a vehicle has the problem in that the diameter of the pipe is increased and the refrigerant charge is also increased because the pipe of the downstream side of the external heat exchanger, through which liquid-phase refrigerant flows in the air-conditioning mode, is utilized for a use purpose to make gas-phase refrigerant of low-temperature and low-pressure flow through the pipe of the downstream side in the heat pump mode.

Additionally, the heat pump system for the vehicle can simplify the pipe because using the same refrigerant flow channel for a dehumidification mode in the air-conditioning mode and the heat pump mode.

In addition, the heat pump system for the vehicle exchanges heat with outdoor air through tubes and radiation fins of an air-cooling type radiator under the condition that coolant temperature (waste heat of the electronic units) of the air-cooling type radiator is lower than the outdoor air temperature so as to absorb heat from the outdoor air.

MODE FOR INVENTION

Figure 1:
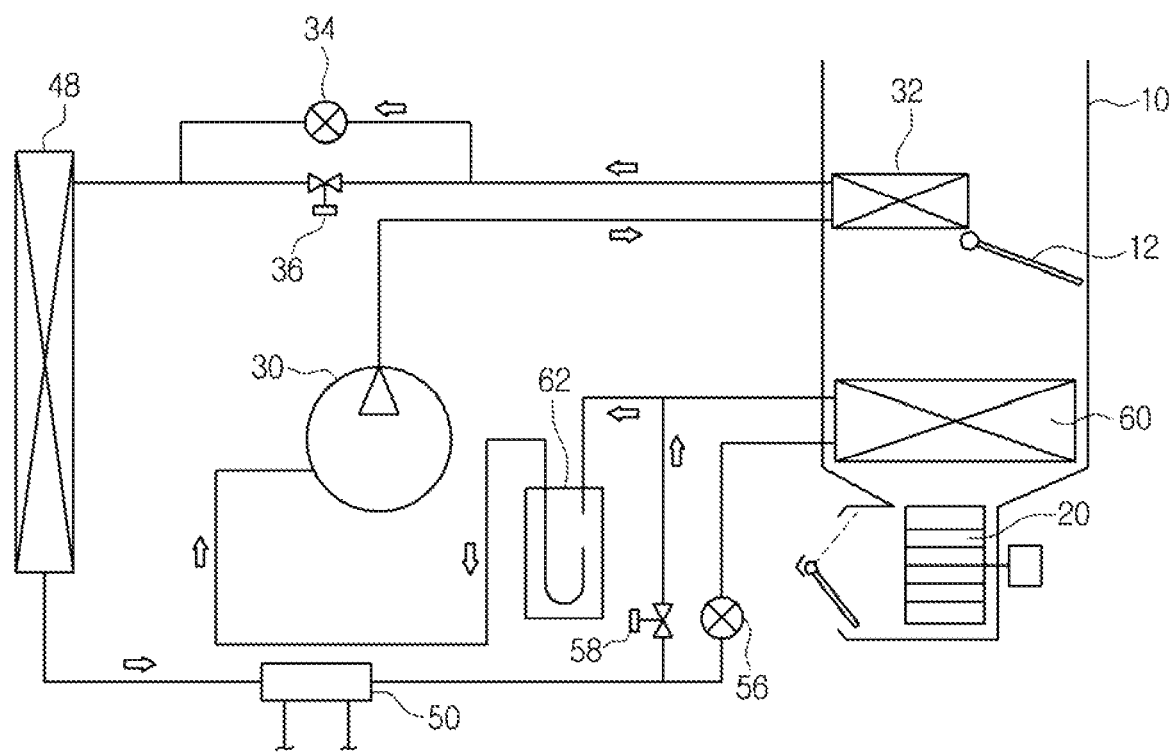
FIG. 1 is a configurative diagram of a conventional heat pump system for a vehicle.

Reference will be now made in detail to the preferred embodiment of the present invention with reference to the attached drawings.

First, a heat pump system for a vehicle according to the present invention includes a compressor 100, an internal heat exchanger 110, second expansion means 120 (such as an expansion valve), an external heat exchanger 130, a refrigerant-coolant heat exchanger 180, first expansion means 140 (such as an expansion valve), and an evaporator 160 which are connected on a refrigerant circulation line (R) in order, and is preferably applied to an electric vehicle or a hybrid vehicle.

The refrigerant circulation line (R) is configured in such a way that refrigerant circulates through the compressor 100, the internal heat exchanger 110, the refrigerant-coolant heat exchanger 180, the external heat exchanger 130, the second expansion means 120, the evaporator 160 and the compressor 100 in an air-conditioning mode and circulates through the compressor 100, the internal heat exchanger 110, the first expansion means 140, the external heat exchanger 130, the refrigerant-coolant heat exchanger 180 and the compressor 100 in a heat pump mode.

The refrigerant circulation line (R) is divided into two lines at an outlet of the internal heat exchanger 110: one being a first refrigerant circulation line (R1) on which the refrigerant discharged from the internal heat exchanger 110 in the air-conditioning mode circulates through the refrigerant-coolant heat exchanger 180, the external heat exchanger 130, the second expansion means 120, the evaporator 160 and the compressor 100; and the other one being a second refrigerant circulation line (R2) on which the refrigerant discharged from the internal heat exchanger 110 in the heat pump mode circulates through the first expansion means 140, the external heat exchanger 130, the refrigerant-coolant heat exchanger 180 and the compressor 100.

In other words, on the first refrigerant circulation line (R1), the refrigerant-coolant heat exchanger 180 is arranged at an upstream side of the external heat exchanger 130 to cool the refrigerant with coolant, and on the second refrigerant circulation line (R2), the refrigerant-coolant heat exchanger 180 is arranged at a downstream side of the external heat exchanger 130 to heat the refrigerant with the coolant.

The first refrigerant circulation line (R1) and the second refrigerant circulation line (R2) diverge at the refrigerant circulation line (R) of the outlet side of the internal heat exchanger 110, join at the refrigerant circulation line (R) of the inlet side of the compressor 100, and then, become a single line in a section between the external heat exchanger 130 and the refrigerant-coolant heat exchanger 180.

In other words, the refrigerant circulation line (R) is formed into a single line in a partial section but diverges into two lines, namely, the first refrigerant circulation line (R1) and the second refrigerant circulation line (R2) in another partial section.

That is, the refrigerant circulation line (R) has the single line in the section between the inlet side of the compressor 100 and the outlet side of the internal heat exchanger 110, but has two lines in the section between the outlet side of the internal heat exchanger 110 and the inlet side of the compressor 100 through the first and second refrigerant circulation lines (R1) and (R2).

In this instance, the section ranging from the external heat exchanger 130 to the refrigerant-coolant heat exchanger 180 is formed into the single line within the section of the first and second refrigerant circulation lines (R1) and (R2). That is, referring to FIG. 3 which shows the heat pump mode, the section from the inlet side of the external heat exchanger 130 to the outlet side of the refrigerant-coolant heat exchanger 180 is formed into the single line within the section of the first and second refrigerant circulation lines (R1) and (R2).

In other words, referring to FIG. 3, the single line starts between the second expansion means 120 and the external heat exchanger 130 and ends between the refrigerant-coolant heat exchanger 180 and a first direction changing valve 190 which will be described later.

Therefore, in the air-conditioning mode, because the refrigerant flows along the first refrigerant circulation line (R1), the refrigerant first flows into the refrigerant-coolant heat exchanger 180, and then, flows to the external heat exchanger 130. In the heat pump mode, because the refrigerant flows along the second refrigerant circulation line (R2), the refrigerant first flows into the external heat exchanger 130, and then, flows to the refrigerant-coolant heat exchanger 180.

In other words, in the air-conditioning mode and the heat pump mode, the refrigerant flows in the reverse direction in the single line section, and hence, the refrigerant which flows the refrigerant-coolant heat exchanger 180 and the external heat exchanger 130 mounted in the single line section also flows in the reverse direction.

Furthermore, a bypass line (R3) is connected to the second refrigerant circulation line (R2) in parallel so that the refrigerant circulating the second refrigerant circulation line (R2) bypasses the external heat exchanger 130.

Figure 3:
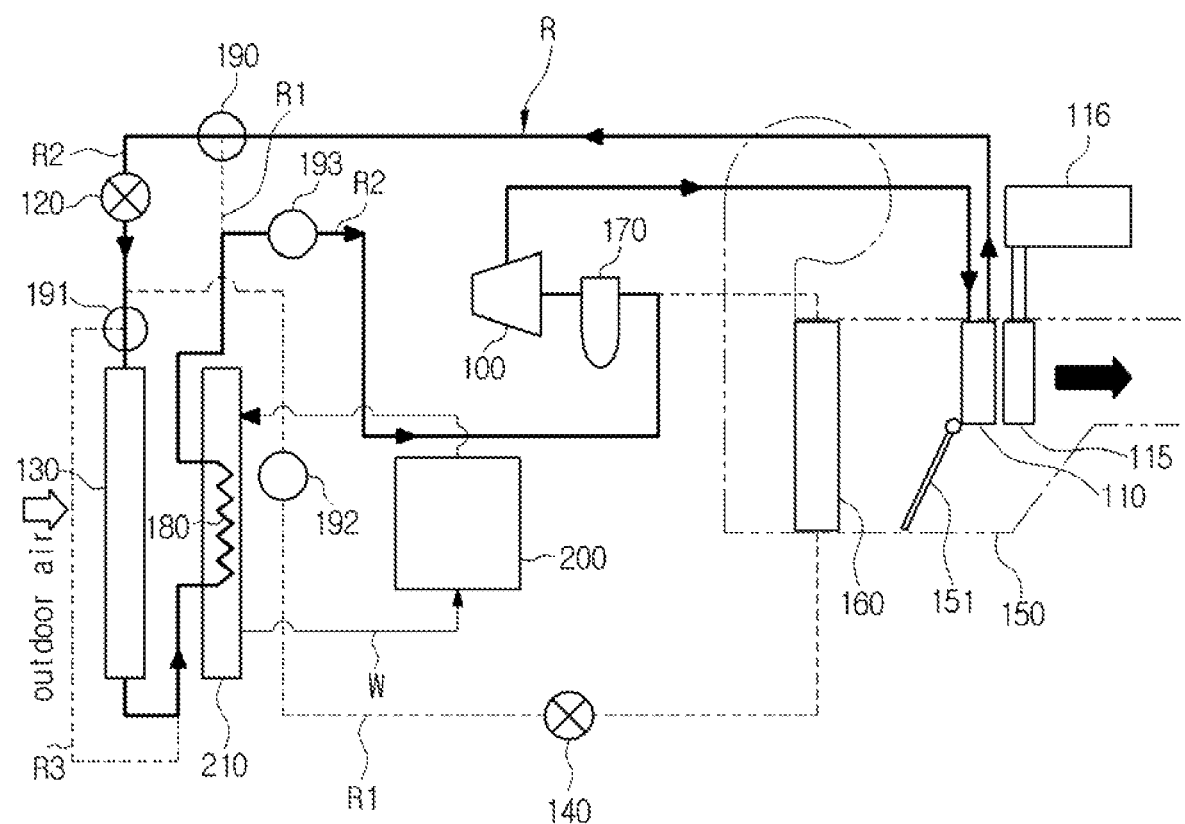
FIG. 3 is a configurative diagram of a heat pump mode in the heat pump system for the vehicle according to the preferred embodiment of the present invention.

The bypass line (R3) is connected to the single line section of the first and second refrigerant circulation lines (R1) and (R2), and referring to FIG. 3, an inlet of the bypass line (R3) is connected with the second refrigerant circulation line (R2) located at an inlet of the external heat exchanger 130, namely, is connected to the second refrigerant circulation line (R2) between the second expansion means 120 and the external heat exchanger 130.

An outlet of the bypass line (R3) is connected with the second refrigerant line (R2) located at an outlet of the external heat exchanger 130, namely, is connected to the second refrigerant circulation line (R2) between the external heat exchanger 130 and the refrigerant-coolant heat exchanger 180.

Additionally, on the refrigerant circulation line (R), a first direction changing valve 190 is mounted at the diverging point of the first refrigerant circulation line (R1) and the second refrigerant circulation line (R2).

The first direction changing valve 190 is a three-way valve which regulates a flow direction of the refrigerant discharged from the internal heat exchanger 110 to the first refrigerant circulation line (R1) or the second refrigerant circulation line (R2) according to the air-conditioning mode or the heat pump mode.

In other words, the first direction changing valve 190 makes the refrigerant discharged from the internal heat exchanger 110 flow to the first refrigerant circulation line (R1) in the air-conditioning mode, and makes the refrigerant discharged from the internal heat exchanger 110 flow to the second refrigerant circulation line (R2).

Moreover, a second direction changing valve 191 for regulating the flow direction of the refrigerant is mounted at a diverging point of the second refrigerant circulation line (R2) and the bypass line (R3).

The second direction changing valve 191 makes the refrigerant circulating the second refrigerant circulation line (R2) in the heat pump mode bypass the external heat exchanger 130 because the external heat exchanger 130 cannot absorb heat from outdoor air smoothly when frosting is formed on the external heat exchanger 130 or when outdoor temperature is 0° C. or below.

In the meantime, besides the case that the refrigerant bypasses the external heat exchanger 130 when outdoor temperature is 0° C. or below, if the system is set in such a way that the refrigerant passes through the external heat exchanger 130 only when heat exchanging efficiency between the outdoor air and the refrigerant flowing through the external heat exchanger 130 is good but bypasses the external heat exchanger 130 when heat exchanging efficiency is not good, heating performance and efficiency of the system can be enhanced.

Furthermore, when frosting is formed on the external heat exchanger 130, the refrigerant flows to the bypass line (R3) and bypasses the external heat exchanger 130 in order to delay or remove frosting.

Additionally, a first on-off valve 192 is mounted on the first refrigerant circulation line (R1) located at an outlet of the external heat exchanger 130 to regulate the flow of the refrigerant, and a second on-off valve 193 is mounted on the second refrigerant circulation line (R2) located at an outlet of the refrigerant-coolant heat exchanger 180 to regulate the flow of the refrigerant.

Figure 2:
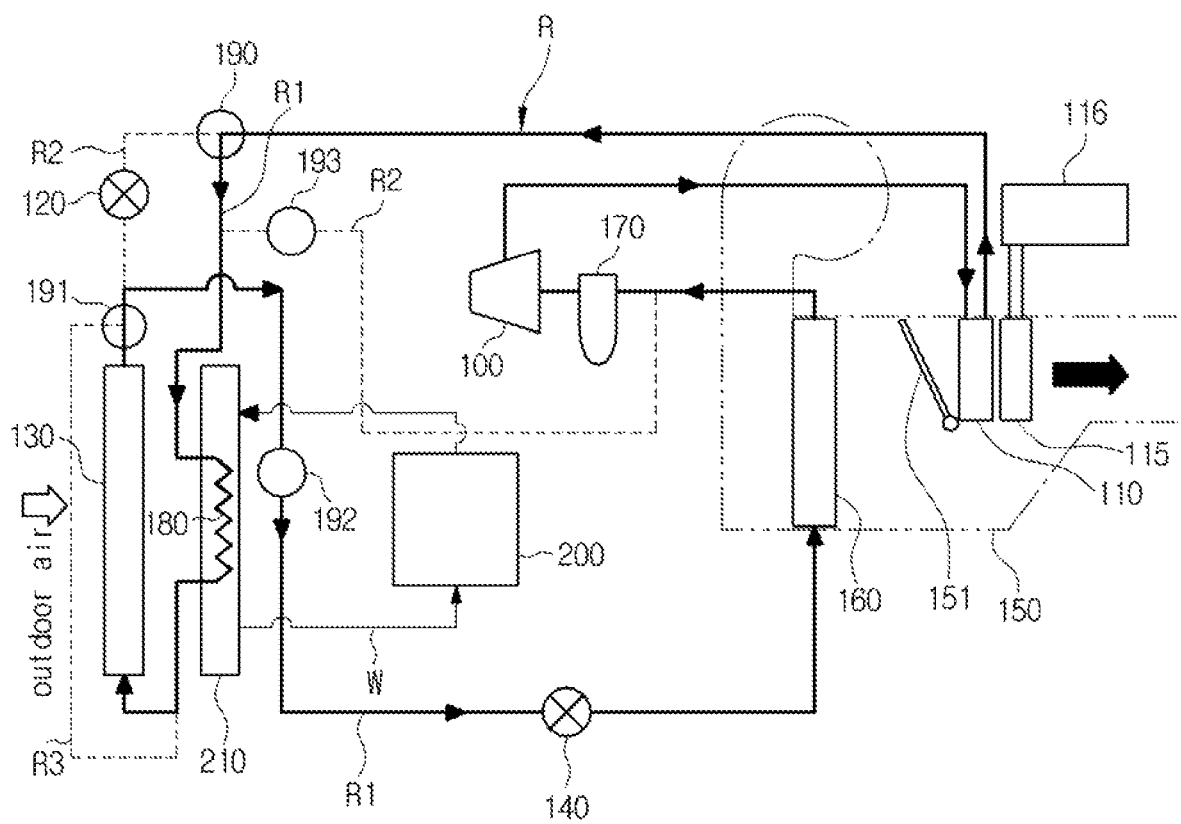
FIG. 2 is a configurative diagram of an air-conditioning mode in a heat pump system for a vehicle according to a preferred embodiment of the present invention.

Referring to FIG. 2, the first on-off valve 192 is mounted between the external heat exchanger 130 and the first expansion means 140 in the first refrigerant circulation line (R1) in order to open the first refrigerant circulation line (R1) in the air-conditioning mode and to close the first refrigerant circulation line (R1) in the heat pump mode.

In the meantime, the first on-off valve 192 opens the first refrigerant circulation line (R1) in the dehumidification mode of the heat pump mode in order to supply some of the refrigerant passing through the second expansion means 120 in the second refrigerant circulation line (R2) to the first expansion means 140 and the evaporator 160 through the first refrigerant circulation line (R1).

Referring to FIG. 3, the second on-off valve 193 is mounted between the refrigerant-coolant heat exchanger 180 and the compressor 100 in the second refrigerant circulation line (R2) in order to close the second refrigerant circulation line (R2) in the air-conditioning mode and to open the second refrigerant circulation line (R2) in the heat pump mode.

The compressor 100, the interior heat exchanger 110 are mounted along the refrigerant flow direction in the refrigerant circulation line (R) in order, the refrigerant-coolant heat exchanger 180, the external heat exchanger 130, the first expansion means 140 and the evaporator 160 are mounted along the refrigerant flow direction in the first refrigerant circulation line (R1) diverging from the refrigerant circulation line (R) located at the outlet of the internal heat exchanger 110 in order, and the second expansion means 120, the external heat exchanger 130 and the refrigerant-coolant heat exchanger 180 are mounted along the refrigerant flow direction in the second refrigerant circulation line (R2) diverging from the refrigerant circulation line (R) located at the outlet of the internal heat exchanger 110.

Of course, as described above, because some of the section of the first and second refrigerant circulation lines (R1) and (R2) is formed into a single line, the refrigerant flows through the refrigerant-coolant heat exchanger 180 and the external heat exchanger 130 mounted in the single line section in the air-conditioning mode and the heat pump mode.

Therefore, as shown in FIG. 2, in the air-conditioning mode, the refrigerant discharged from the compressor 100 circulates in order of the internal heat exchanger 110, the refrigerant-coolant heat exchanger 180, the external heat exchanger 130, the first expansion means 140, the evaporator 160 and the compressor 100.

In this instance, all of the refrigerant-coolant heat exchanger 180 and the external heat exchanger 130 serve as a condenser.

That is, in the air-conditioning mode, the refrigerant of high temperature passing through the compressor 100 and the internal heat exchanger 110 radiates heat to coolant while passing through the refrigerant-coolant heat exchanger 180, and radiates heat to outdoor air to be cooled (condensed) while passing through the external heat exchanger 130.

Moreover, in the heat pump mode, as shown in FIG. 3, the refrigerant discharged from the compressor 100 circulates in order of the internal heat exchanger 110, the second expansion means 120, the external heat exchanger 130, the refrigerant-coolant heat exchanger 180 and the compressor 100.

In this instance, the internal heat exchanger 110 serves as a condenser, and the external heat exchanger 130 and the refrigerant-coolant heat exchanger 180 serve as an evaporator 160.

That is, in the heat pump mode, refrigerant of low temperature expanded in the second expansion means 120 after passing through the compressor 100 and the internal heat exchanger 110 absorbs heat from outdoor air while passing through the external heat exchanger 130, and then, absorbs heat from the coolant to be heated (evaporated) while passing through the refrigerant-coolant heat exchanger 180.

In the meantime, in the dehumidification mode of the heat pump mode, the refrigerant passing through the second expansion means 120 flows not only to the second refrigerant circulation line (R2) but also to the first refrigerant circulation line (R1) and is supplied to the first expansion means 140 and the evaporator 160 to dehumidify the interior of the vehicle.

As described above, the heat pump system according to the present invention radiates heat of the refrigerant to the coolant and the outdoor air through the refrigerant-coolant heat exchanger 180 and the external heat exchanger 130 while flowing along the first refrigerant circulation line (R1) in the air-conditioning mode, and absorbs heat from the outdoor air and the coolant through the external heat exchanger 130 and the refrigerant-coolant heat exchanger 180 while flowing along the second refrigerant circulation line (R2) in the heat pump mode.

Hereinafter, components of the heat pump system for the vehicle according to the present invention will be described in detail.

First, the compressor 100 inhales and compresses refrigerant while operating by receiving a driving force from an engine (an internal combustion engine) or a motor, and then, discharges the refrigerant in a gas phase of high-temperature and high-pressure.

The compressor 100 inhales and compresses the refrigerant discharged from the evaporator 160 and supplies to the internal heat exchanger 110 in the air-conditioning mode, and inhales and compresses the refrigerant discharged from the refrigerant-coolant heat exchanger 180 and supplies the refrigerant to the internal heat exchanger 110 in the heat pump mode.

The internal heat exchanger 110 is mounted inside the air-conditioning case 150 and connected with the refrigerant circulation line (R) of the outlet side of the compressor 100 so as to exchange heat between air flowing inside the air-conditioning case 150 and the refrigerant discharged from the compressor 100.

Furthermore, the evaporator 160 is mounted inside the air-conditioning case 150 and connected with the refrigerant circulation line (R) of the inlet side of the compressor 100 so as to exchange heat between the air flowing inside the air-conditioning case 150 and the refrigerant supplied to the compressor 100.

The internal heat exchanger 110 serves as a condenser all in the air-conditioning mode and the heat pump mode.

The evaporator 160 serves as an evaporator in the air-conditioning mode, but is stopped in the heat pump mode because refrigerant is not supplied and serves as an evaporator in the dehumidification mode because some of the refrigerant is supplied.

Moreover, the internal heat exchanger 110 and the evaporator 160 are spaced apart from each other at a predetermined interval inside the air-conditioning case 150, and in this instance, are mounted in order from the upstream side of the air flow direction inside the air-conditioning case 150.

Therefore, in the air-conditioning mode, as shown in FIG. 2, the refrigerant of low-temperature and low-pressure discharged from the first expansion means 140 is supplied to the evaporator 160, and in this instance, the air flowing inside the air-conditioning case 150 through the blower (not shown) is converted into cold air by exchanging heat with the refrigerant of low-temperature and low-pressure of the evaporator 160 while passing through the evaporator 160, and then, is discharged to the interior of the vehicle to thereby cool the interior of the vehicle.

In the heat pump mode, as shown in FIG. 3, the refrigerant of high-temperature and high-pressure discharged from the compressor 100 is supplied to the internal heat exchanger 110, and in this instance, the air flowing inside the air-conditioning case 150 through the blower (not shown) is converted into warm air by exchanging heat with the refrigerant of high-temperature and high-pressure of the internal heat exchanger 110 while passing through the internal heat exchanger 110, and then, is discharged to the interior of the vehicle to thereby heat the interior of the vehicle.

In the meantime, it is preferable that the evaporator 160 be larger than the internal heat exchanger 110.

Moreover, a temperature-adjustable door 151 for adjusting an amount of air bypassing the internal heat exchanger 110 and an amount of air passing through the internal heat exchanger 110 is mounted between the evaporator 160 and the internal heat exchanger 110 inside the air-conditioning case 150.

The temperature-adjustable door 151 adjusts the amount of the air bypassing the internal heat exchanger 110 and the amount of the air passing through the internal heat exchanger 110 to thereby properly control temperature of the air discharged from the air-conditioning case 150.

In this instance, in the air-conditioning mode, as shown in FIG. 2, when a front side path of the internal heat exchanger 110 is completely closed by the temperature-adjustable door 151, because the cold air passing through the evaporator 160 bypasses the internal heat exchanger 110 and is supplied to the interior of the vehicle, the maximum heating is carried out. In the heat pump mode, as shown in FIG. 3, when a path bypassing the internal heat exchanger 110 is completely closed by the temperature-adjustable door 151, because all of the air is converted into warm air while passing through the internal heat exchanger 110 and the warm air is supplied to the interior of the vehicle, the maximum heating is carried out.

Furthermore, the external heat exchanger 130 is mounted outside the air-conditioning case 150 and connected with the refrigerant circulation line (R) so as to exchange heat between the refrigerant circulating through the refrigerant circulation line (R) and the outdoor air.

In this instance, the external heat exchanger 130 is mounted in the section where the first and second refrigerant circulation lines (R1) and (R2) are formed in the single line.

In the air-conditioning mode, the external heat exchanger 130 radiates heat like a condenser, and in this instance, the refrigerant of high-temperature and high-pressure flowing inside the external heat exchanger 130 radiates heat and is cooled (condensed) while exchanging heat with the outdoor air. In the heat pump mode, the external heat exchanger 130 absorbs heat like an evaporator, and in this instance, refrigerant of low-temperature flowing inside the external heat exchanger 130 absorbs heat and is heated (evaporated) while exchanging heat with the outdoor air.

In the meantime, the external heat exchanger 130 is mounted at the front side inside the engine room of the vehicle, and of course, an air-cooling type radiator 210 is also mounted at the front side inside the engine room. In this instance, the external heat exchanger 130 and the air-cooling type radiator 210 are arranged to be overlapped with each other in a flow direction of drive wind force.

Moreover, a coolant circulation line (W) which circulates coolant toward the electronic units 200 of the vehicle to cool the electronic units 200 of the vehicle.

There are motors, inverters and others as the electronic units 200 of the vehicle.

The air-cooling type radiator 210 for cooling the coolant circulating through the coolant circulation line (W) and a water pump (P) for circulating the coolant along the coolant circulation line (W) are mounted in the coolant circulation line (W).

Therefore, when the water pump (P) is operated, the coolant circulates along the coolant circulation line (W), and in this process, the coolant passing through the electronic units 200 is heated while cooling the electronic units 200, and in this instance, the heated coolant is cooled by heat exchange with outdoor air while passing through the air-cooling type radiator 210.

Figure 7:
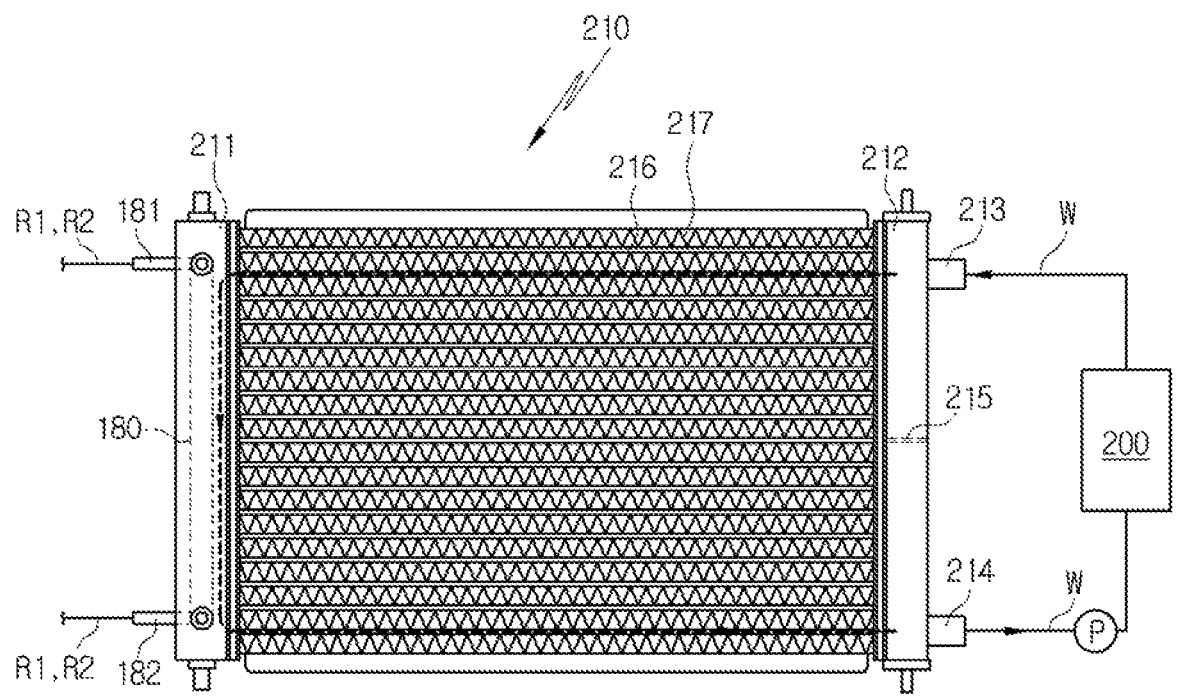
FIG. 7 is a view showing a refrigerant-coolant heat exchanger and an air-cooling type radiator in the heat pump system for the vehicle according to the preferred embodiment of the present invention.
Figure 8:
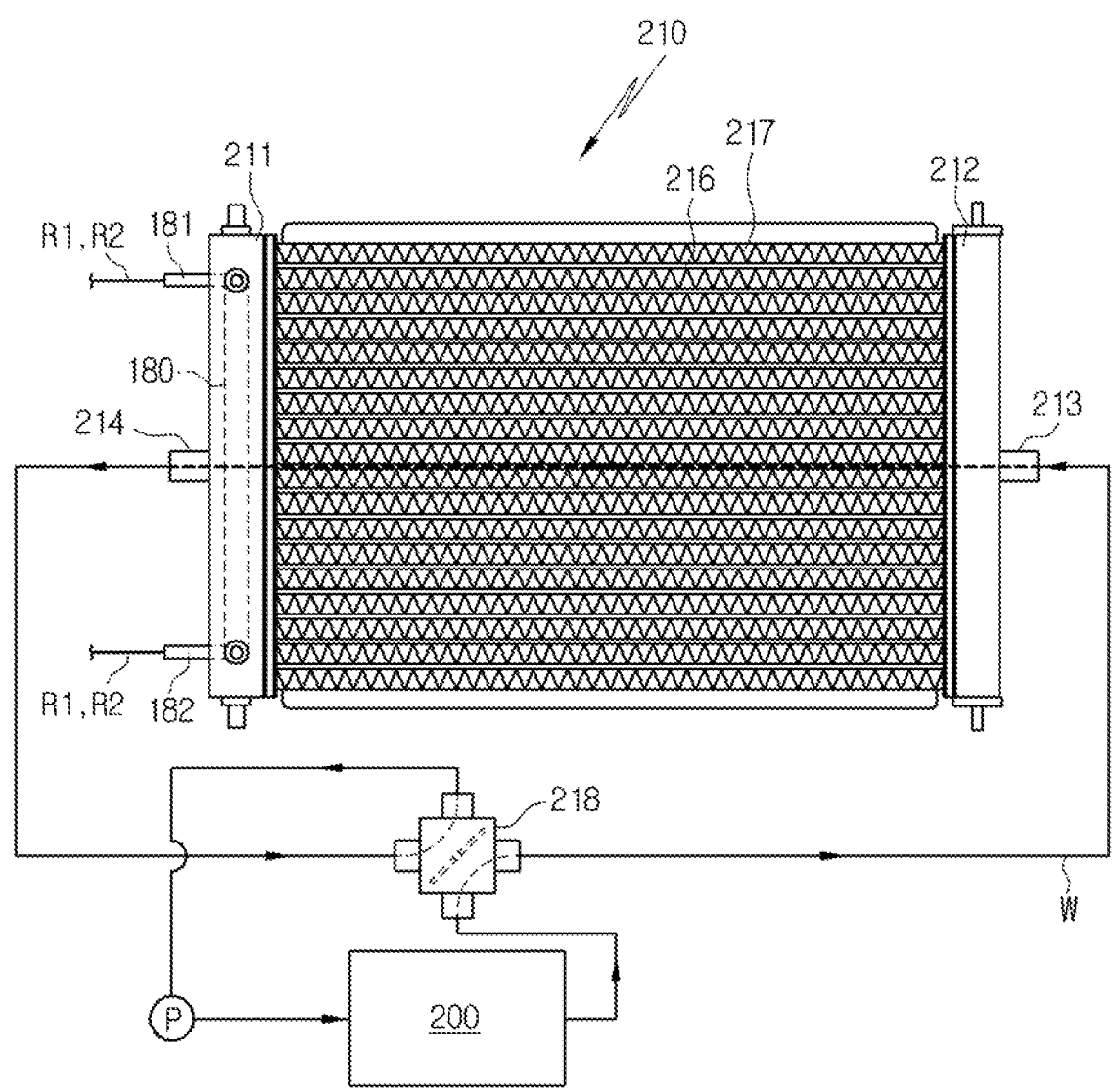
FIG. 8 is a view showing a refrigerant-coolant heat exchanger and an air-cooling type radiator in the heat pump system for the vehicle according to another preferred embodiment of the present invention.

The air-cooling type radiator 210 has two types as described in two preferred embodiments shown in FIGS. 7 and 8.

The air-cooling type radiator 210 shown in FIG. 7 includes: a pair of header tanks 211 and 212 which respectively have an inlet pipe 213 and an outlet pipe 214 to be connected with the coolant circulation line (W) and are spaced apart from each other at a predetermined interval; a plurality of tubes 216 of which both end portions are connected to the header tanks 211 and 212 to communicate the header tanks 211 and 212 with each other; and radiation fins 217 which are interposed among the tubes 216.

The inlet pipe 213 and the outlet pipe 214 are spaced apart from each other on the header tank 212 opposed to the header tank 211 on which the refrigerant-coolant heat exchanger 180.

Additionally, a partition wall 215 for partitioning the inside of the header tank 212 is mounted inside the header tank 212 between the inlet pipe 213 and the outlet pipe 214.

Therefore, the coolant flowing into the inlet pipe 213 flows along tubes 216 partitioned by the partition wall 215, and then is supplied to the header tank 211 on which the refrigerant-coolant heat exchanger 180 is mounted. The coolant supplied to the header tank 211 exchanges heat with the refrigerant of the refrigerant-coolant heat exchanger 180 while making a U-turn. After that, the coolant flows along the other tube 216 partitioned by the partition wall 215, and is discharged through the outlet pipe 214.

The refrigerant-coolant heat exchanger 180 is mounted inside the air-cooling type radiator 210, namely, is inserted and mounted inside the header tank 211 of the two header tanks 211 and 212. Therefore, the refrigerant flowing the refrigerant-coolant heat exchanger 180 exchanges heat with the coolant flowing the air-cooling type radiator 210.

In this instance, the refrigerant-coolant heat exchanger 180 is inserted and mounted into the header tank 211 opposed to the header tank 212 which has the inlet and outlet pipes 213 and 214.

Moreover, the refrigerant-coolant heat exchanger 180 has inlet and outlet pipes 181 and 182 and is connected with the first and second refrigerant circulation lines (R1) and (R2).

Meanwhile, the inlet and outlet pipes 181 and 182 of the refrigerant-coolant heat exchanger 180 are connected with the single line section of the first and second refrigerant circulation lines (R1) and (R2).

Therefore, the refrigerant of high temperature which flows the refrigerant-coolant heat exchanger 180 is cooled by heat exchange with the coolant of the air-cooling type radiator 210 in the air-conditioning mode, and the refrigerant of low temperature which flows the refrigerant-coolant heat exchanger 180 is heated by heat exchange with the coolant of the air-cooling type radiator 210.

In the meantime, the refrigerant-coolant heat exchanger 180 can constantly keep a heat source of the coolant in the heat pump mode because being located between the external heat exchanger 130 and the air-cooling type radiator 210.

Figure 9:
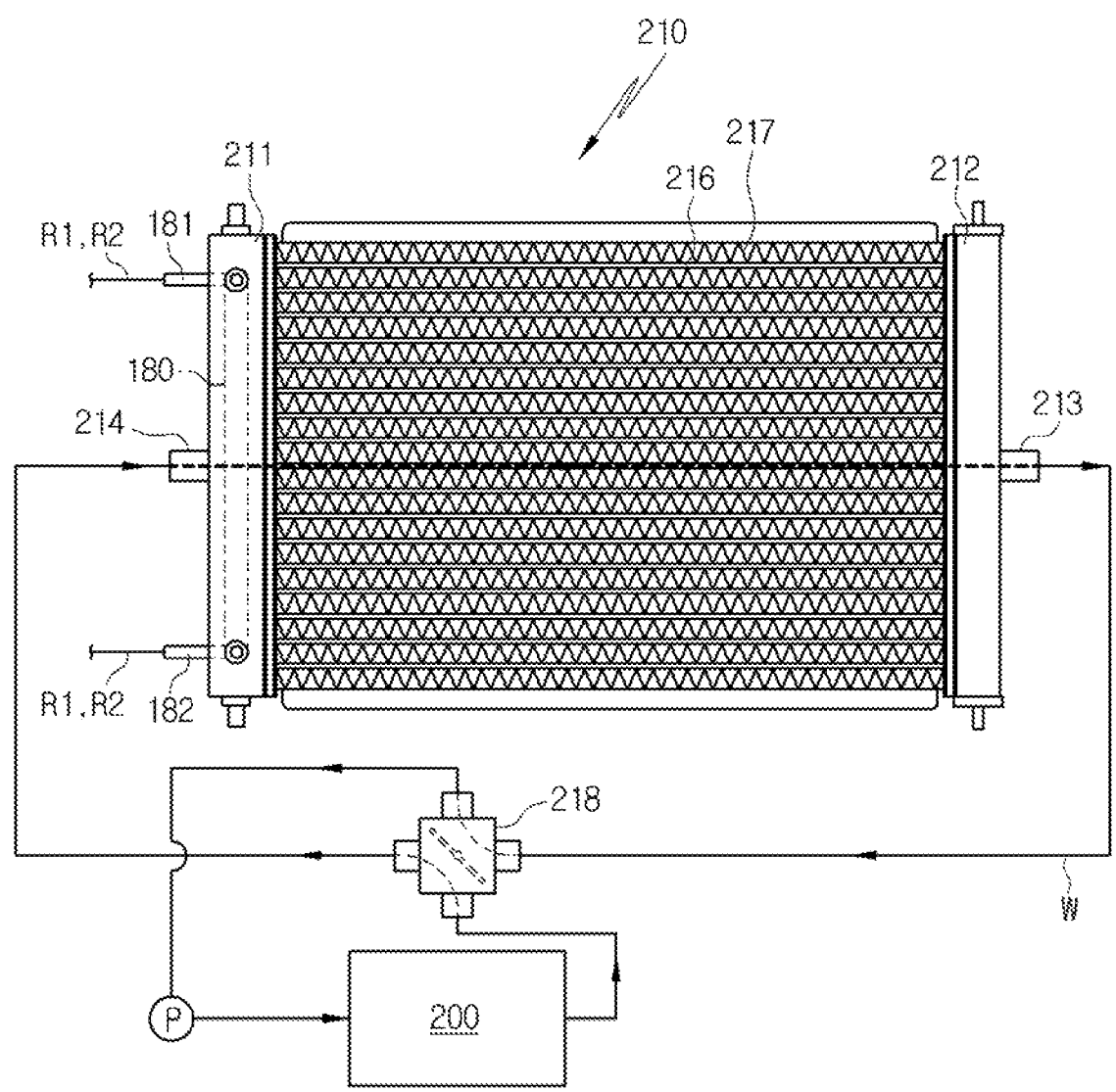
FIG. 9 is a view showing a state where coolant flows in the reverse direction in the air-cooling type radiator of FIG. 8.

The inlet and outlet pipes 213 and 214 of the air-cooling type radiator 210 shown in FIGS. 8 and 9 are different from the air-cooling type radiator 210 shown in FIG. 7 in position.

That is, the inlet pipe 213 of the air-cooling type radiator 210 of FIGS. 8 and 9 is disposed in the header tank 212 of the two header tanks 211 and 212, and the outlet pipe 214 is disposed in the other header tank 211.

Furthermore, a four-way valve 218 for reversely converting the flow direction of the coolant circulating through the coolant circulation line (W) is mounted on the coolant circulation line (W).

That is, in the coolant circulation line (W), the water pump (P), the electronic units 200, the four-way valve 218, the air-cooling type radiator 210, the four-way valve 218 and the water pump (P) are connected in order.

Therefore, when the water pump (P) is operated, the coolant which circulates along the coolant circulation line (W) circulates to the water pump (P) in order of the electronic units 200, the four-way valve 218, the air-cooling type radiator 210 and the four-way valve 218.

In this instance, the coolant flowing into the inlet pipe 213 of the air-cooling type radiator 210 flows to the other header tank 211 after passing all of the tubes 216 at the same time.

After that, the coolant exchanges heat with the refrigerant of the refrigerant-coolant heat exchanger 180 inside the header tank 211, and then, is discharged to the outlet pipe 214.

In this instance, when the four-way valve 218 is regulated, the circulation direction of the coolant shown in FIG. 3 is changed into the circulation direction of the coolant shown in FIG. 9.

That is, in the air-conditioning mode, in the coolant circulation direction shown in FIG. 8, the coolant which is cooled by heat exchange with outdoor air while flowing through the air-cooling type radiator 210 exchanges heat with the refrigerant of the refrigerant-coolant heat exchanger 180 in order to enhance air-conditioning performance by improving cooling performance of the refrigerant flowing the refrigerant-coolant heat exchanger 180.

In the heat pump mode, in the coolant circulation direction shown in FIG. 9, the coolant which flows into the air-cooling type radiator 210 exchanges heat with the refrigerant of the refrigerant-coolant heat exchanger 180 before exchanging heat with outdoor air, in order to enhance heating performance by improving heating performance of the refrigerant flowing the refrigerant-coolant heat exchanger 180.

Moreover, as shown in FIG. 2, the first expansion means 140 is formed by an orifice mounted on the first refrigerant circulation line (R1) between the external heat exchanger 130 and the evaporator 160.

Therefore, in the air-conditioning mode, the refrigerant of high temperature passing through the external heat exchanger 130 expands while passing the orifice which is the first expansion means 140, is converted into refrigerant of low-temperature and low-pressure, and then, is supplied to the evaporator 160.

As show in FIG. 3, the second expansion means 120 is formed by an orifice mounted on the second refrigerant circulation line (R2) between the internal heat exchanger 110 and the external heat exchanger 130.

Therefore, in the heat pump mode, the refrigerant of high temperature passing through the internal heat exchanger 110 expands while passing the orifice which is the second expansion means 120, is converted into refrigerant of low-temperature and low-pressure, and then, is supplied to the external heat exchanger 130.

Moreover, an accumulator 170 is mounted on the refrigerant circulation line (R) of the inlet side of the compressor 100.

The accumulator 170 divides the refrigerant which is supplied to the compressor 100 into the liquid-phase refrigerant and the gas-phase refrigerant and supplies only the gas-phase refrigerant to the compressor 100.

Moreover, an electric heater 115 for enhancing a heating efficiency is further mounted at the downstream side of the internal heat exchanger 110 inside the air-conditioning case 150.

The electric heater 115 is connected with a battery 116 of the vehicle.

That is, the heat pump system according to the present invention operates the electric heater 115 using an auxiliary heat source in the early stage of car starting, can operate the electric heater 115 even in the case of lack of the heat source.

It is preferable that the electric heater 115 is a PTC heater.

The heat pump system for the vehicle according to the present invention can enhance cooling performance without any increase in size of the external heat exchanger 130 because the refrigerant radiates heat to the coolant and the outdoor air through the refrigerant-coolant heat exchanger 180 and the external heat exchanger 130 to be cooled in the air-conditioning mode, enhance heating performance because the refrigerant absorbs heat from the outdoor air and the coolant (waste heat of the electronic units) through the external heat exchanger 130 and the refrigerant-coolant heat exchanger 180 to be heated in the heat pump mode, and further enhance heating performance and efficiency by operating the heat pump mode even though outdoor temperature is zero or below or frosting is formed on the external heat exchanger 130 because recovering the waste heat through the refrigerant-coolant heat exchanger 180.

Additionally, when the refrigerant-coolant heat exchanger 180 is united with the air-cooling type radiator 210 for cooling the electronic units 200, the heat pump system can reduce the number of components and a space for mounting components because it does not need additional heat exchanger, such as a chiller, and a coolant line for connecting the chiller.

In addition, the heat pump system can reduce power consumption of the compressor 100 by reducing refrigerant pressure at the time of cooling when using the refrigerant-coolant heat exchanger 180.

Moreover, the heat pump system independently uses the first refrigerant circulation line (R1) at the downstream side of the external heat exchanger 130 in which liquid-phase refrigerant flows in the air-conditioning mode, so as to reduce the diameter of pipes and reduce refrigerant charge. That is, the conventional heat pump system has a problem in that the diameter of pipes is increased and the refrigerant charge is also increased because gas-phase refrigerant of low-temperature and low-pressure flows in the downstream side pipe of the external heat exchanger 130, in which liquid-phase refrigerant flows in the air-conditioning mode, in the heat pump mode.

Furthermore, the heat pump system according to the present invention can simplify the pipes because using the same refrigerant flow channel for the dehumidification mode in the air-conditioning mode and the heat pump mode.

Additionally, because the refrigerant-coolant heat exchanger 180 is united with the air-cooling type radiator 210, the coolant of the air-cooling type radiator 210 can absorb heat from the outdoor air by exchanging heat with the outdoor air through the radiation fins 217 and the tubes 216 of the air-cooling type radiator 210 under the condition that temperature of the coolant (waste heat of the electronic units) is lower than that of the outdoor air.

Hereinafter, the action of the heat pump system for the vehicle according to the preferred embodiment of the present invention will be described.

A. Air-Conditioning Mode (Cooling Mode) (See FIG. 2)

In the air-conditioning mode (cooling mode), as shown in FIG. 2, the first direction changing valve 190 converts the flow direction of the refrigerant discharged from the internal heat exchanger 110 so that the refrigerant flows toward the first refrigerant circulation line (R1), the first on-off valve 192 is opened and the second on-off valve 193 is closed, and then, the bypass line (R3) is closed through the second direction changing valve 191.

Moreover, the water pump (P) is operated so that the refrigerant circulates to the electronic units 200 and the air-cooling type radiator 210 of the coolant circulation line (W).

Meanwhile, in order to achieve the maximum cooling, the temperature-adjustable door 151 inside the air-conditioning case 150 closes the path passing through the internal heat exchanger 110, so that the air blown into the air-conditioning case 150 by the blower is cooled while passing through the evaporator 160 and bypasses the internal heat exchanger 110 to be supplied to the interior of the vehicle, thereby cooling the interior of the vehicle.

Continuously, a refrigerant circulation process will be described.

The gas-phase refrigerant of high-temperature and high-pressure discharged after being compressed in the compressor 100 is supplied to the internal heat exchanger 110 mounted inside the air-conditioning case 150.

As shown in FIG. 2, the refrigerant supplied to the internal heat exchanger 110 does not exchange heat with the air but flows to the first refrigerant circulation line (R1) because the temperature-adjustable door 151 closes a path of the internal heat exchanger 110.

The refrigerant flowing to the first refrigerant circulation line (R1) exchanges heat with the coolant, which circulates through the air-cooling type radiator 210 while passing through the refrigerant-coolant heat exchanger 180, to be condensed (cooled).

The refrigerant condensed while passing through the refrigerant-coolant heat exchanger 180 flows to the external heat exchanger 130 and exchanges heat with the outdoor air to be condensed (cooled) again.

As described above, the refrigerant which passes the refrigerant-coolant heat exchanger 180 and the external heat exchanger 130 in order, is cooled while exchanging heat with the coolant (waste heat) and the outdoor air in order to be converted into the liquid-phase refrigerant.

Continuously, the refrigerant passing through the external heat exchanger 130 is decompressed and expanded while passing through the first expansion means 140 so as to become a liquid-phase refrigerant of low-temperature and low-pressure, and then, is induced into the evaporator 160.

The refrigerant induced into the evaporator 160 is evaporated by exchanging heat with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is induced into the compressor 100 and recirculates the above cycle.

B. Heat Pump Mode (Heating Mode) (See FIG. 3)

In the heat pump mode, as shown in FIG. 3, the first direction changing valve 190 converts the flow direction of the refrigerant discharged from the internal heat exchanger 110 so that the refrigerant flows toward the second refrigerant circulation line (R2), the first on-off valve 192 is closed and the second on-off valve 193 is opened, and then, the bypass line (R3) is closed through the second direction changing valve 191.

Moreover, the water pump (P) is operated so that the refrigerant circulates to the electronic units 200 and the air-cooling type radiator 210 of the coolant circulation line (W).

Additionally, in the heat pump mode, the temperature-adjustable door 151 inside the air-conditioning case 150 closes the path bypassing the internal heat exchanger 110, so that the air blown into the air-conditioning case 150 by the blower is changed into warm air while passing through the internal heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is induced into the internal heat exchanger 110 mounted inside the air-conditioning case 150.

The gas-phase refrigerant of high-temperature and high-pressure induced into the internal heat exchanger 110 is condensed while exchanging heat with the air blown into the air-conditioning case 150 by the blower, and in this instance, the air passing through the internal heat exchanger 110 is converted into warm air and supplied to the interior of the vehicle to heat the interior of the vehicle.

Continuously the refrigerant discharged from the internal heat exchanger 110 flows to the second refrigerant circulation line (R2), is decompressed and expanded while passing through the second expansion means 120 to become a liquid-phase refrigerant of low-temperature and low-pressure, and then, is supplied to the external heat exchanger 130.

The refrigerant supplied to the external heat exchanger 130 is evaporated while exchanging heat with the outdoor air, and then, is supplied to the refrigerant-coolant heat exchanger 180.

The refrigerant supplied to the refrigerant-coolant heat exchanger 180 exchanges heat with the coolant circulating through the air-cooling type radiator 210 to be evaporated again.

As described above, the refrigerant which passes in order of the external heat exchanger 130 and the refrigerant-coolant heat exchanger 180 is evaporated (heated) while exchanging heat with the outdoor air and the coolant (waste heat) in order, so that the liquid-phase refrigerant is converted into gas-phase refrigerant.

Continuously, the refrigerant passing through the refrigerant-coolant heat exchanger 180 flows into the compressor 100, and then, recirculates the above cycle.

Figure 4:
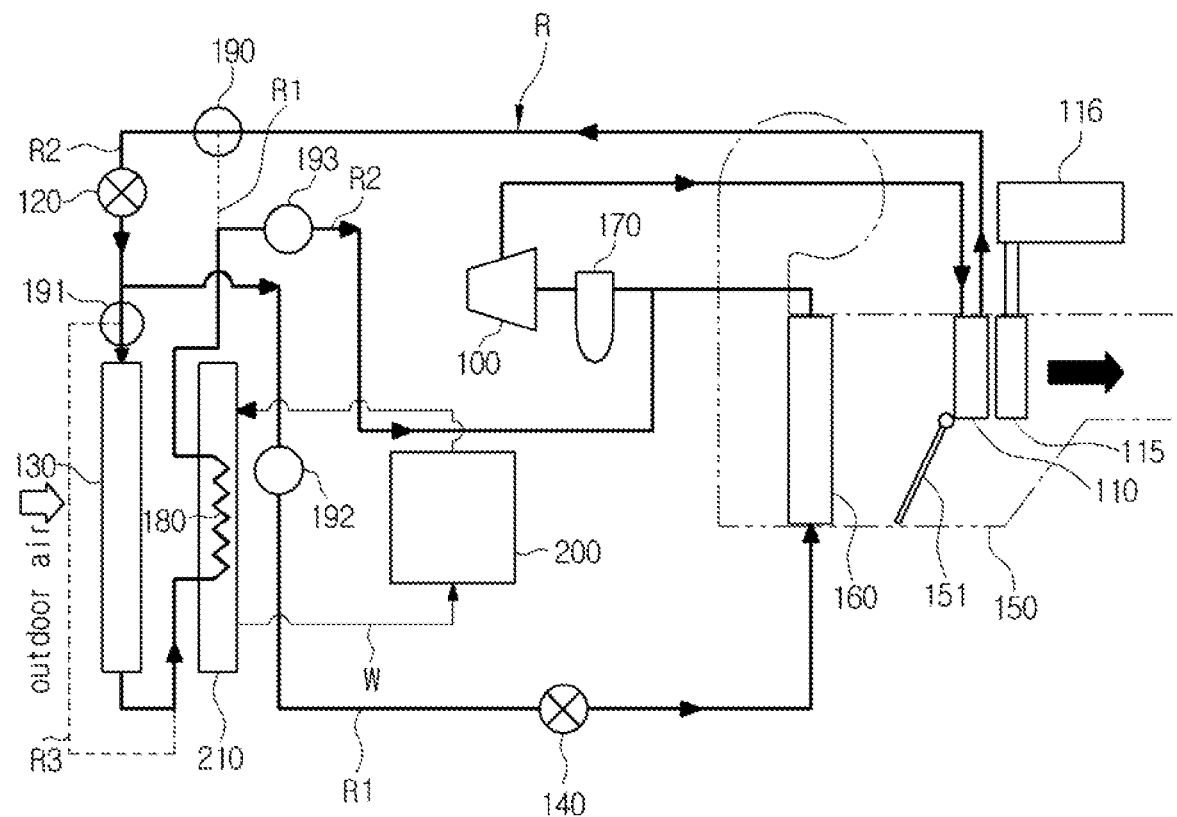
FIG. 4 is a configurative diagram of a dehumidification mode while carrying out the heat pump mode in the heat pump system for the vehicle according to the preferred embodiment of the present invention.

C. Dehumidification Mode of Heat Pump Mode (See FIG. 4)

The dehumidification mode of the heat pump mode is operated only in the case that dehumidification of the interior of the vehicle is needed while the system is operated in the heat pump mode of FIG. 3.

Therefore, only different parts from the heating mode of FIG. 3 will be described.

In the dehumidification mode, the first on-off valve 192 is additionally opened under the heat pump mode, so that the refrigerant flows also to the first refrigerant circulation line (R1).

Moreover, in the dehumidification mode, the temperature-adjustable door 151 inside the air-conditioning case 150 closes a path bypassing the internal heat exchanger 110. Therefore, air blown into the air-conditioning case 150 by a blower is cooled while passing the evaporator 160, and then, is changed into warm air while passing the internal heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

Some of the refrigerant passing the compressor 100, the internal heat exchanger 110, and the second expansion means 120 passes the external heat exchanger 130 and the refrigerant-coolant heat exchanger 180, and some of the refrigerant passes the first refrigerant circulation line (R1).

The refrigerant passing the external heat exchanger 130 and the refrigerant-coolant heat exchanger 180 is evaporated while exchanging heat with the outdoor air and the coolant (waste heat).

The refrigerant flowing toward the first refrigerant circulation line (R1) passes the first expansion means 140, and then, is supplied to the evaporator 160 to be evaporated while exchanging heat with the air flowing inside the air-conditioning case 150.

In the above process, the air passing the evaporator 160 is dehumidified, and the dehumidified air is changed into warm air while passing the internal heat exchanger 110, and then, is supplied to the interior of the vehicle so as to carry out dehumidification and heating.

After that, the refrigerants respectively passing the refrigerant-coolant heat exchanger 180 and the evaporator 160 are joined together, and then, the joined refrigerant is induced into the compressor 100 and recirculates through the above cycle.

D. Defrosting Mode During Heat Pump Mode (See FIG. 5)

The defrosting mode of the heat pump mode is operated in a case that frosting is formed on the external heat exchanger 130.

Therefore, only parts different from those of the heat pump mode shown in FIG. 3 will be described.

In the defrosting mode, the bypass line (R3) is opened through the second direction changing valve 191 under the heat pump mode.

Continuously, a refrigerant circulation process will be described.

The refrigerant passing the compressor 100, the internal heat exchanger 110 and the second expansion means 120 bypasses the external heat exchanger 130 while flowing along the bypass line (R3), and then, is supplied to the refrigerant-coolant heat exchanger 180.

In this instance, frosting is removed because refrigerant is not supplied to the external heat exchanger 130.

Continuously, the refrigerant supplied to the refrigerant-coolant heat exchanger 180 is evaporated while exchanging heat with the coolant (waste heat), and then, flows into the compressor 100 in order to recirculate through the above cycle.

Figure 6:
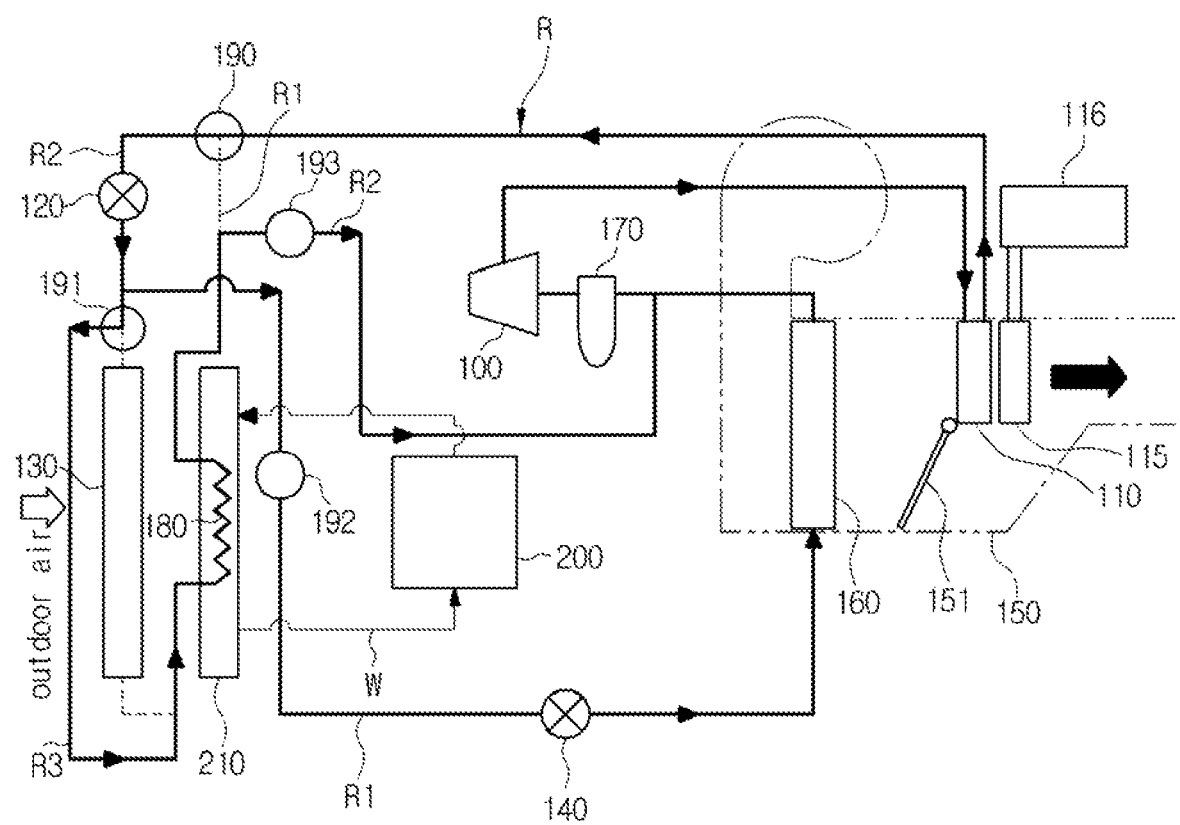
FIG. 6 is a configurative diagram of a dehumidification mode while carrying out the defrosting mode of the heat pump mode in the heat pump system for the vehicle according to the preferred embodiment of the present invention.

E. Dehumidification Mode During Defrosting Mode of Heat Pump Mode (FIG. 6)

The dehumidification mode during the defrosting mode of the heat pump mode is operated when dehumidification of the interior of the vehicle is needed during the defrosting mode.

Figure 5:
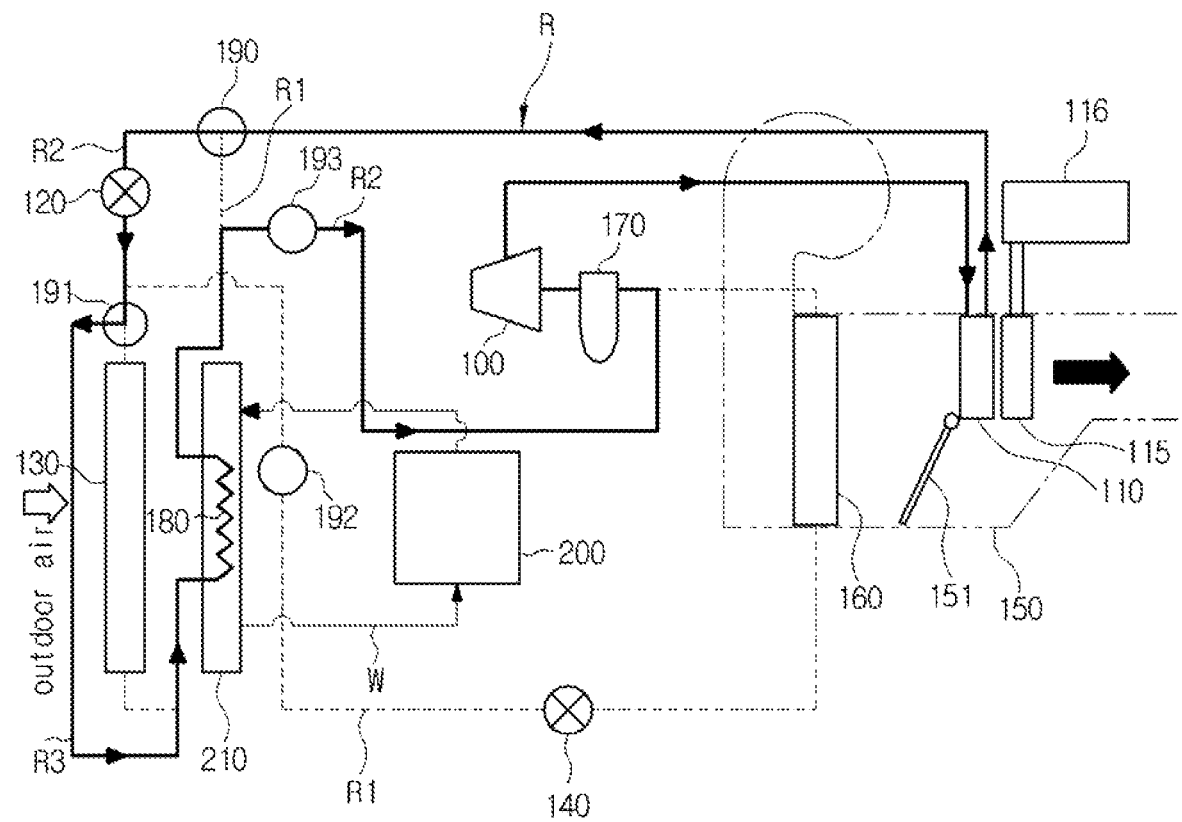
FIG. 5 is a configurative diagram of a defrosting mode while carrying out the heat pump mode in the heat pump system for the vehicle according to the preferred embodiment of the present invention.

Therefore, only parts different from those of the defrosting mode of FIG. 5 will be described.

In the dehumidification mode during the defrosting mode, the first on-off valve 192 is additionally opened under the defrosting mode to make the refrigerant flow also to the first refrigerant circulation line (R1).

Additionally, in dehumidification mode during the defrosting mode, the temperature-adjustable door 151 inside the air-conditioning case 150 closes the pass bypassing the internal heat exchanger 110. So, after the air blown into the air-conditioning case 150 by the blower is cooled while passing through the evaporator 160, the cooled air is converted into warm air while passing through the internal heat exchanger 110, and then, the warm air is supplied to the interior of the vehicle to heat the interior of the vehicle.

In this instance, because an amount of the refrigerant supplied to the evaporator 160 is small, the heat pump system minimizes a change in indoor temperature because air cooling performance is low and smoothly dehumidifies the air passing through the evaporator 160.

Continuously, a refrigerant circulation process will be described.

Some of the refrigerant passing the compressor 100, the internal heat exchanger 110 and the second expansion means 120 bypasses the external heat exchanger 130 while flowing along the bypass line (R3), and then, is supplied to the refrigerant-coolant heat exchanger 180.

Some of the refrigerant flows into the first refrigerant circulation line (R1).

The refrigerant supplied to the refrigerant-coolant heat exchanger 180 is evaporated while exchanging heat with the coolant (waste heat).

The refrigerant flowing to the first refrigerant circulation line (R1) is supplied to the evaporator after passing through the first expansion means 140, and is evaporated while exchanging heat with the air flowing inside the air-conditioning case 150.

In the above process, the air passing the evaporator 160 is dehumidified, and the dehumidified air passing through the evaporator 160 is converted into warm air while passing the internal heat exchanger 110, and then, is supplied to the interior of the vehicle to dehumidify and heat the interior of the vehicle.

After that, the refrigerants respectively passing the refrigerant-coolant heat exchanger 180 and the evaporator 160 are joined together, and then, the joined refrigerant is induced into the compressor 100 and recirculates through the above cycle.

What is claimed is:

1. A heat pump system for a vehicle, comprising:
   a compressor mounted on a refrigerant circulation line for compressing and discharging refrigerant;
   an internal heat exchanger mounted inside an air-conditioning case for exchanging heat between the air inside the air-conditioning case and the refrigerant discharged from the compressor;
   an evaporator mounted inside the air-conditioning case for exchanging heat between the air inside the air-conditioning case and the refrigerant supplied to the compressor;
   an external heat exchanger mounted outside the air-conditioning case for exchanging heat between the refrigerant circulating through the refrigerant circulation line and an outdoor air;
   a coolant circulation line configured to circulate coolant toward electronics of the vehicle to cool the electronics; and
   a refrigerant-coolant heat exchanger configured to exchange heat between the refrigerant circulating through the refrigerant circulation line and the coolant circulating through the coolant circulation line,
   wherein an air-cooling radiator is mounted on the coolant circulation line to cool the coolant circulating through the coolant circulation line, and
   wherein the refrigerant-coolant heat exchanger is mounted inside the air-cooling radiator,
   wherein the refrigerant circulation line is configured in such a way that the refrigerant circulates in order of the compressor, the internal heat exchanger, the refrigerant-coolant heat exchanger, the external heat exchanger, the first expansion valve, the evaporator and the compressor in the air-conditioning mode, so that the refrigerant circulating in the refrigerant circulation line radiates heat to the coolant and the outdoor air through the refrigerant-coolant heat exchanger and the external heat exchanger.

2. The heat pump system according to claim 1, further comprising: first expansion valve mounted on the refrigerant circulation line located at an inlet of the evaporator to expand the refrigerant supplied to the evaporator; and second expansion valve mounted on the refrigerant circulation line located at an outlet of the internal heat exchanger to selectively expand refrigerant discharged from the internal heat exchanger.

3. The heat pump system according to claim 2, wherein the refrigerant circulation line is configured in such a way that the refrigerant circulates in order of the compressor, the internal heat exchanger, the second expansion valve, the external heat exchanger, the refrigerant-coolant heat exchanger and the compressor in the heat pump mode, so that the refrigerant circulating in the refrigerant circulation line absorbs heat from the outdoor air and the coolant through the external heat exchanger and the refrigerant-coolant heat exchanger.

4. The heat pump system according to claim 2, wherein the refrigerant circulation line comprises two lines diverging in the refrigerant circulation line located at the outlet of the internal heat exchanger, the two lines including: a first refrigerant circulation line which is configured in such a way that the refrigerant discharged from the internal heat exchanger circulates in order of the refrigerant-coolant heat exchanger, the external heat exchanger, the first expansion valve, the evaporator and the compressor in the air-conditioning mode; and a second refrigerant circulation line which is configured in such a way that the refrigerant discharged from the internal heat exchanger circulates in order of the second expansion valve, the external heat exchanger, the refrigerant-coolant heat exchanger and the compressor in the heat pump mode.

5. The heat pump system according to claim 1, wherein the air-cooling radiator comprises: a pair of header tanks which have an inlet pipe and an outlet pipe to be connected with the coolant circulation line and are spaced apart from each other at a predetermined interval;
a plurality of tubes of which both end portions are connected to the header tanks to communicate the header tanks with each other; and radiation fins which are interposed among the tubes, wherein the refrigerant-coolant heat exchanger is inserted and mounted into the header tank of the two header tanks.

6. The heat pump system according to claim 5, wherein the inlet and outlet pipes are spaced apart from each other on the header tank opposed to the header tank on which the refrigerant-coolant heat exchanger is mounted, and a partition wall for partitioning the inside of the header tank is mounted inside the header tank between the inlet pipe and the outlet pipe, so that the coolant flowing into the inlet pipe is discharged to the outlet pipe by making a U-turn at the header tank in which the refrigerant-coolant heat exchanger is mounted.

7. The heat pump system according to claim 5, wherein the inlet pipe is disposed in one of the header tank of the two header tanks, and the outlet pipe is disposed in the other header tank, and wherein a four-way valve for reversely converting the flow direction of the coolant circulating through the coolant circulation line is mounted on the coolant circulation line.

8. The heat pump system according to claim 4, wherein a first direction changing valve is mounted at the diverging point between the first refrigerant circulation line and the second refrigerant circulation line to regulate a flow direction of the refrigerant discharged from the internal heat exchanger to the first refrigerant circulation line or the second refrigerant circulation line according to the air-conditioning mode or the heat pump mode.

9. The heat pump system according to claim 4, wherein a bypass line is mounted on the second refrigerant circulation line in parallel so that the refrigerant circulating the second refrigerant circulation line bypasses the external heat exchanger, and
wherein a second direction changing valve for regulating the flow direction of the refrigerant is mounted at a diverging point of the second refrigerant circulation line and the bypass line.

10. The heat pump system according to claim 9, wherein an inlet of the bypass line is connected with the second refrigerant circulation line located at an inlet of the external heat exchanger, and
wherein an outlet of the bypass line is connected with the second refrigerant circulation line located at an outlet of the external heat exchanger.

11. The heat pump system according to claim 5, wherein a first on-off valve is mounted at the first refrigerant circulation line located at the outlet of the external heat exchanger to regulate the flow of the refrigerant.

12. The heat pump system according to claim 4, wherein a second on-off valve is mounted at the second refrigerant circulation line located at an outlet of the refrigerant-coolant heat exchanger to regulate the flow of the refrigerant.

13. The heat pump system according to claim 11, wherein in a dehumidification mode under the heat pump mode, the first on-off valve is opened so that some of the refrigerant passing through the second expansion valve in the second refrigerant circulation line is supplied to the first expansion valve and the evaporator through the first refrigerant circulation line.

14. The heat pump system according to claim 4, wherein the first refrigerant circulation line and the second refrigerant circulation line diverging from the refrigerant circulation line at the outlet of the internal heat exchanger are formed into a single line in a section ranging from the external heat exchanger to the refrigerant-coolant heat exchanger, so that the refrigerant flows reversely in the single line section in the air-conditioning mode and the heat pump mode.

15. The heat pump system according to claim 1, wherein the external heat exchanger and the air-cooling radiator are mounted at the front side inside an engine room of the vehicle in such a way as to be arranged to be overlapped with each other in the drive wind force direction.

16. A heat pump system for a vehicle, comprising:
a compressor mounted on a refrigerant circulation line for compressing and discharging refrigerant;
an internal heat exchanger mounted inside an air-conditioning case for exchanging heat between the air inside the air-conditioning case and the refrigerant discharged from the compressor;
an evaporator mounted inside the air-conditioning case for exchanging heat between the air inside the air-conditioning case and the refrigerant supplied to the compressor; and
an external heat exchanger mounted outside the air-conditioning case for exchanging heat between the refrigerant circulating through the refrigerant circulation line and an outdoor air, further comprising:

a coolant circulation line configured to circulate coolant toward electronics of the vehicle to cool the electronics; and a refrigerant-coolant heat exchanger configured to exchange heat between the refrigerant circulating through the refrigerant circulation line and the coolant circulating through the coolant circulation line, wherein an air-cooling radiator is mounted on the coolant circulation line to cool the coolant circulating through the coolant circulation line, wherein the refrigerant-coolant heat exchanger is mounted inside the air-cooling radiator, and wherein the refrigerant circulation line comprises: a first refrigerant circulation line which arranges the refrigerant-coolant heat exchanger at an upstream side of the external heat exchanger to cool the refrigerant with the coolant at an inlet of the external heat exchanger in an air-conditioning mode; and a second refrigerant circulation line which arranges the refrigerant-coolant heat exchanger at a downstream side of the external heat exchanger to heat the refrigerant with the coolant at an outlet of the external heat exchanger in a heat pump mode.

17. The heat pump system according to claim 16, wherein the first refrigerant circulation line and the second refrigerant circulation line diverge on the refrigerant circulation line located at an outlet of the internal heat exchanger and are joined together on the refrigerant circulation line at an inlet of the compressor, and are formed into a single line in a section ranging from the external heat exchanger to the refrigerant-coolant heat exchanger.

18. The heat pump system according to claim 16, wherein a first direction changing valve is mounted at the diverging point between the first refrigerant circulation line and the second refrigerant circulation line to regulate a flow direction of the refrigerant discharged from the internal heat exchanger to the first refrigerant circulation line or the second refrigerant circulation line according to the air-conditioning mode or the heat pump mode, and wherein a first on-off valve is mounted at the first refrigerant circulation line to regulate the flow of the refrigerant and a second on-off valve is mounted at the second refrigerant circulation line located at an outlet of the refrigerant-coolant heat exchanger.

19. The heat pump system according to claim 16, wherein a bypass line is mounted on the second refrigerant circulation line in parallel so that the refrigerant circulating the second refrigerant circulation line bypasses the external heat exchanger, and wherein a second direction changing valve for regulating the flow direction of the refrigerant is mounted at a diverging point of the second refrigerant circulation line and the bypass line.

* * * * *